United States Patent
Tanaka

(10) Patent No.: US 6,413,464 B1
(45) Date of Patent: Jul. 2, 2002

(54) RUBBER COMPOSITION FOR USE IN INJECTION MOLDING, GOLF BALL INCLUDING THE SAME, AND GOLF BALL PRODUCING METHOD

(75) Inventor: Hiroaki Tanaka, Kobe (JP)

(73) Assignee: Sumitomo Rubber Industries, Limited, Kobe (JP)

( * ) Notice: Subject to any disclaimer, the term of this patent is extended or adjusted under 35 U.S.C. 154(b) by 0 days.

(21) Appl. No.: 09/433,958

(22) Filed: Nov. 4, 1999

(30) Foreign Application Priority Data

Nov. 4, 1998 (JP) .......................... 10-313703

(51) Int. Cl.⁷ .................. B29C 45/00; A63B 37/06
(52) U.S. Cl. ................... 264/328.2; 264/331.13; 525/263; 525/274; 525/301; 525/305; 473/371; 473/372
(58) Field of Search ................... 525/263, 274, 525/301, 305; 473/371, 372; 264/328.2, 331.13

(56) References Cited

U.S. PATENT DOCUMENTS

| | | | | |
|---|---|---|---|---|
| 4,141,559 A | * | 2/1979 | Melvin | |
| 4,483,537 A | * | 11/1984 | Hanada | |
| 4,546,980 A | * | 10/1985 | Gendreau | |
| 5,874,038 A | * | 2/1999 | Kasashima | |
| 5,998,506 A | * | 12/1999 | Nesbitt | |

FOREIGN PATENT DOCUMENTS

| | | |
|---|---|---|
| JP | 57-25337 | 2/1982 |
| JP | 2-80068 | 3/1990 |

OTHER PUBLICATIONS

Brown "Injection Moulding of Plastic Components" pp. 108–111; 1979.*

* cited by examiner

Primary Examiner—David J. Buttner
(74) Attorney, Agent, or Firm—Birch, Stewart, Kolasch & Birch, LLP

(57) ABSTRACT

Provided are a rubber composition for injection molding with which it is possible to prevent scorching by ensuring the fluidity of the rubber composition needed for injection molding to suppress a temperature rise of the composition in an injection cylinder, without impairing the performance characteristics of a vulcanized product, as well as a golf ball using the rubber composition and its producing method. The rubber composition for injection molding includes a diene rubber, a crosslinking agent, an α, β-unsaturated carboxylic acid and/or metal salt thereof, and α, β-unsaturated carboxylic alkylester. The ratio of the total amount of the unsaturated carboxylic acid and the metal salt to the content of the alkylester ranges from 1.0 to 12.

9 Claims, 2 Drawing Sheets

RUBBER COMPOSITION FOR USE IN INJECTION MOLDING, GOLF BALL INCLUDING THE SAME, AND GOLF BALL PRODUCING METHOD

This application is based on patent application No. 10-313703 filed in Japan, the contents of which are hereby incorporated by references.

BACKGROUND OF THE INVENTION

1. Field of the Invention

This invention relates to a rubber composition suitable for injection molding, more particularly to a rubber composition suitable for a golf ball, a golf ball provided with a vulcanized rubber composition layer and having required performance characteristics, and a method for producing such a golf ball at a high productivity.

2. Description of the Prior Art

A core and other parts of a golf ball are generally made by compressively vulcanizing and molding a rubber composition comprising: a diene rubber; a co-crosslinking agent, such as acrylic acid, methacrylic acid, or its metal salt; and an initiator for initiating graft polymerization of the diene rubber and the co-crosslinking agent, such as organic peroxides. In the compressive vulcanization molding, it has been required to accurately measure the weight of rubber composition to be fed into a mold for the reason that a variation in the feeding amount of rubber composition causes a variation in the weight of products. However, this strict weight measurement has lowered the production efficiency. Further, the rubber composition is vulcanized by heat transmitted through the wall of the mold which is heated by a specified vulcanization temperature before vulcanizing the rubber composition. This heating process requires a long time. In particular, vulcanization of a golf ball core, which has a great thickness, takes a considerably long time. This makes it difficult to reduce the time for vulcanization and molding, consequently hindering the improvement of productivity.

In order to solve the foregoing problems, in recent years, it has been discussed to utilize injection molding for production of golf ball core. The injection molding has been expected to decrease the molding cycle time and avoid the product weight variation due to variations in the weighing in the compressive vulcanization molding of golf ball core. Conventionally, most of injection molding machines are designed for molding of thermoplastic resin. However, it can be seen that such injection molding machines are utilizable to molding rubber compositions and thermosetting resins by modifying the construction of an injection molding machine and the operation temperature of a cylinder of the machine and the mold so as to be suitable for production of rubber and thermosetting resin. In vulcanization molding of rubber composition, especially, injection molding is advantageous in the aspect of cost reduction because of the fact that heat occurs owing to internal friction in the rubber composition moving in a cylinder passage extending to the mold, and it is not thus necessary to heat and keep the cylinder at a high temperature. Further, since the rubber composition is imparted with sufficient heat caused by the internal friction to have a temperature near a vulcanization temperature when entering the mold. Therefore, the mold can be heated to a specified vulcanizaition temperature in a shorter time than in the compressive vulcanization molding.

In the case of injection molding a rubber composition, the cylinder of the injecting machine is heated to soften the rubber composition. However, this heating is liable to cause the following problem. Specifically, crosslinking of the rubber composition starts due to the heated cylinder and the heat caused by internal friction in the rubber composition. After the crosslinking starting, the viscosity of the rubber composition increases and the fluidity of the rubber composition decreases. The decreased fluidity increases the heat of internal friction, consequently accelerating vulcanization. Finally, the rubber composition is entirely vulcanized, which thus making a desired molding impossible. Especially, a rubber composition for golf ball, which includes an organic peroxide as crosslinking agent (or vulcanization initiator), has a greater initial vulcanization rate than a rubber composition including sulfur or the like as crosslinking agent. Accordingly, a keen control must be performed to prevent vulcanization from being initiated in the cylinder passage.

To prevent scorching (i.e., premature vulcanization) or maintain a proper fluidity, it can be proposed to keep the temperature of the cylinder lower, or to increase the area of a gate (or inflow opening) of the mold. However, these manners make the vulcanization and molding operation longer, and thus lessen the advantageous effect of the injection molding, that is, raising the productivity. Further, even if a rubber composition having been subject to scorching is fed in the mold by increasing the area of the gate or increasing the transfer force of a screw in the cylinder, and successfully vulcanized in the mold to form a desired product, the thus molded product is likely to have a poor elasticity and resilience, and an anisotropies due to remaining internal stress. Accordingly, it can be seen that this manner is improper for production of rubber products requiring resilience and isotropy, such as golf ball.

Further, it can be proposed to add a plasticizer or oil to the rubber composition to increase its fluidity and prevent heat of internal friction. However, there is the problem that some of the added plasticizer or oil blooms on a surface of the molded rubber composition. In the case of the molded rubber composition being a core of a two-piece golf ball, there is a likelihood that plasticizer or oil on a surface of the core migrate to a cover enclosing the core, thereby swelling the cover. The swell of the cover degrades the strength and rigidity of the cover, and then lowers the durability and resilience of the golf ball.

SUMMARY OF THE INVENTION

It is an object of the present invention to provide a rubber composition for injection molding, a golf ball, and a golf ball producing method which have overcome the problems residing in the prior art.

It is another object of the present invention to provide a rubber composition for injection molding and a golf ball producing method which make it possible to assure a proper fluidity and temperature of a rubber composition in an injection cylinder to prevent scorching from occurring in the composition, thereby producing a vulcanized and molded product having required performance characteristics.

According to an aspect of the present invention, a rubber composition for injection molding comprises a diene rubber; a crosslinking agent; an $\alpha$, $\beta$-unsaturated carboxylic acid and/or a metal salt thereof; and $\alpha$, $\beta$-unsaturated carboxylic alkylester. The ratio of the total content of the $\alpha$, $\beta$-unsaturated carboxylic acid and the metal salt to the content of the alkylester, namely, [(carboxylic acid+metal salt thereof)/ester], ranges from 1.0 to 12.

According to another aspect of the invention, a golf ball comprises a rubber part made from the above-mentioned inventive rubber composition.

According to still another aspect of the invention, a method for producing a golf ball, comprises injecting the above-mentioned inventive rubber composition into a mold having a gate part area of 0.4 mm$^2$ to 20 mm$^2$; and vulcanizing the rubber composition in the mold.

These and other objects, features, aspects and advantages of the present invention will become more apparent from the following detailed description of the present invention when taken in conjunction with the accompanying drawings.

DETAILED DESCRIPTION OF THE PREFERRED EMBODIMENT OF THE INVENTION

Figure 1A:
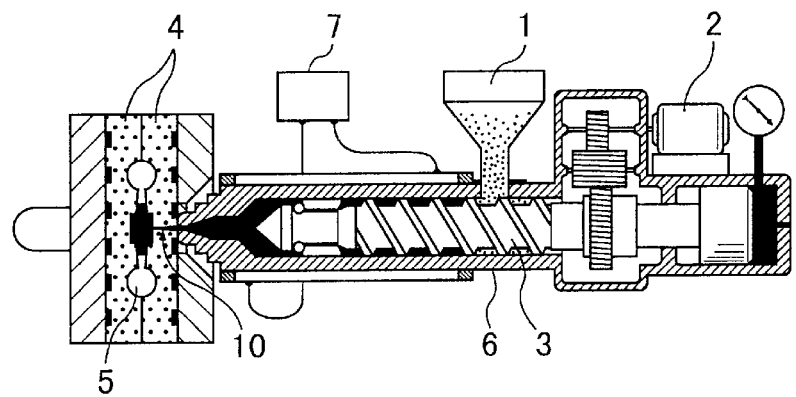
FIGS. 1A to 1C are diagrams showing an injection molding system executing an injection molding according to an embodiment of the present invention.

Inventors of the present application have found that α, β-unsaturated carboxylic alkylester capable of forming co-crosslinking with diene rubber brings about no blooming in a vulcanized and molded product, and can ensure a required resilience and the like, and serves as lubricant in a rubber composition, like a plasticizer, to increase the fluidity of the rubber composition.

Specifically, an inventive rubber composition for injection molding comprises a diene rubber; a crosslinking agent; an α, β-unsaturated carboxylic acid and/or a metal salt thereof; and an α, β-unsaturated carboxylic alkylester. A ratio of the total content of the unsaturated carboxylic acid and the metal salt to the content of alkylester, i.e., [(carboxylic acid+metal salt thereof)/ester)], ranges from 1.0 to 12.

It may be preferable to add 15 to 45 parts by weight of metal salt of α, β-unsaturated carboxylic acid per 100 parts by weight of diene rubber. The α, β-unsaturated carboxylic alkylester may be preferably an ester which is obtainable from acrylic acid or methacrylic acid and any one of monohydric to trihydric aliphatic alcohols. It may be preferable that the inventive rubber composition includes no plasticizer.

An inventive golf ball includes at least one part formed by vulcanizing the inventive rubber composition. Further, it may be preferable that a core of golf ball is formed by vulcanizing the inventive rubber composition.

An inventive golf ball producing method comprises injecting the inventive rubber composition into a mold, vulcanizing the rubber composition in the mold to form a part of a golf ball. The mold may preferably have a gate having an area of 0.4 to 20 mm$^2$.

An inventive rubber composition will be described in more detail. An inventive rubber composition for injection molding comprises a diene rubber, a crosslinking agent, α, β-unsaturated carboxylic acid and/or a metal salt thereof, and an α, β-unsaturated carboxylic alkylester.

Any diene rubber which includes a diene component in its molecules may be used for the inventive rubber composition, for example, butadiene rubber (BR), ethylene-propylenediene tercopolymer (EPDM), isoprene rubber (IR), styrene-butadiene rubber (SBR), and acrylonitrile-butadiene rubber (NBR). These may be used singly or in a combination of two or more. It may be preferable to use a rubber including butadiene as a main component, more preferably, 50 percent or more by weight of butadiene. Further, it may be preferable to use a high cis-polybutadiene having 90 percent or more of cis-1,4 bond.

As a crosslinking agent may be used sulfur; a combination of sulfur and a vulcanization initiator; an organic peroxide such as dicumyl peroxide, 1,1-bis(t-butyl peroxy)-3,5-trimethylcyclohexane, 2,5-dimethyl-2,5-di(t-butyl peroxy) hexane, and di-t-butyl peroxide. In the case of using the inventive rubber composition for production of a golf ball, it may be preferable to use an organic peroxide, which is excellent as a vulcanization initiator, more preferably, dicumyl peroxide. The content of an organic peroxide is preferably from 0.1 to 3.0 parts by weight, more preferably from 0.3 to 2.5 parts by weight, per 100 parts by weight of diene rubber.

An α, β-unsaturated carboxylic acid or its metal salt is added as a co-crosslinking agent. Either or both of them may be added. In the case of using the inventive rubber composition for production of a golf ball, it may be preferable to add a metal salt of α, β-unsaturated carboxylic acid singly in view of content and resilience.

As example of α, β-unsaturated carboxylic acid, there may be α, β-unsaturated carboxylic acid having 3 to 8 carbon atoms, such as acrylic acid, methacrylic acid and crotonic acid. As example of its metal salt, there may be monohydric or dihydric metal salt, such as sodium salt, potassium salt, zinc salt and magnesium salt. It may be preferable to use zinc acrylate, magnesium acrylate, zinc methacrylate, magnesium methacrylate to give a high resilience to a vulcanized product. To ensure a higher resilience, in particular, zinc acrylate may be preferable. In the case of using the inventive rubber composition for production of a golf ball, the content of an α, β-unsaturated carboxylic acid and/or a metal salt thereof may be preferably from 15 to 45 parts by weight, more preferably, from 20 to 36 parts by weight, per 100 parts by weight of diene rubber. In the case of below 15 parts by weight, the resilience of the vulcanized product (e.g., a golf ball or its core) decreases. On the other hand, if the case of above 45 parts by weight, the vulcanized product is excessively hard, which degrading the shot feeling in the golf ball.

An α, β-unsaturated carboxylic alkylester for the inventive rubber composition is an ester which is obtainable as a reaction product between methacrylic acid or acrylic acid and aliphatic alcohol. The following aliphatic alcohols may be used: linear alkyl alcohol, branched alkyl alcohol, monohydric alcohol having a single hydroxyl group, polyhydric alcohol having two or more hydroxyl groups. However, since an α, β-unsaturated carboxylic alkylester is required to undergo crosslinking reaction with diene rubber and unsaturated carboxylic acid and also to assure a given fluidity when passing through a gate of a mold, its stereo structure must be kept from increasing. In view thereof, it may be preferable to use a linear alkyl alcohol, more preferably, monohydric to trihydric alcohols. Accordingly, it may be preferable to use an ester of monohydric alcohol such as methyl methacrylate, ethyl methacrylate, and lauryl methacrylate; an ester of dihydric alcohol such as ethylene glycol dimethacrylate; and an ester of trihydric alcohol such as trimethylol propane methacrylate. These may be used singly or in a combination of two or more. These esters may be produced not only by esterification reaction of an α, β-unsaturated carboxylic acid and a aliphatic alcohol but also other reaction able to produce these esters.

The above-mentioned α, β-unsaturated carboxylic alkylester serves to accelerate the vulcanization of an inventive rubber composition, in other words, to reduce the vulcanization time. Also, this component serves as a lubricant to reduces intermolecular friction, which consequently reduces the viscosity of the rubber composition to thereby prevent the heat due to internal friction and keep the temperature of the rubber composition from rising in a cylinder passage. In other words, a proper proportion of diene rubber, metal salt of carboxylic acid, and α, β-unsaturated carboxylic alkylester will prevent scorching due to an undesired temperature rise of the rubber composition in the injection cylinder, and reduce the vulcanization time to thereby raise the productivity.

Also, when the organic peroxide of the rubber composition cleaves to initiate vulcanization reaction, the α, β-unsaturated carboxylic alkylester is utilized for polymerization reaction, and then crosslinks with diene rubber. Accordingly, there is no likelihood that some of the α, β-unsaturated carboxylic alkylester oozes or blooms from the vulcanized product, and migrates to a joining part (e.g., cover layer of a golf ball) in contact with the vulcanized product.

Further, the α, β-unsaturated carboxylic alkylester crosslinking with the diene rubber is useful to increase the hardness of the vulcanized product. Although this component cannot raise the resilience as zinc acrylate, in the case of a golf ball, the thus increased hardness contributes to suppress an excess deformation when the ball is shot, thereby keeping the energy loss at a minimized level.

Phthalate such as diethyl phthalate, dioctyl phthalate, and adipate such as dibutyl adipate, dioctyl adipate, which are known to use as plasticizer, belong to the class of ester of carboxylic acid as well as α, β-unsaturated carboxylic ester. Accordingly, these carboxylic esters can be expected to reduce the viscosity of the rubber composition and then suppress the heat due to internal friction. However, such plasticizers as aromatic carboxylic ester (e.g., phthalate) and saturated fatty carboxylic ester (e.g., adipate) cannot combine with the diene rubber and the α, β-unsaturated carboxylic acid or its metal salt when the rubber composition is vulcanized or mold. Accordingly, there is the likelihood that these plasticizers ooze or bloom on a surface of the vulcanized product, and migrates to a joining part in contact with the vulcanized product, and consequently deteriorates the durability and resilience of the vulcanized product.

In the inventive rubber composition, 5 to 40 parts by weight of α, β-unsaturated carboxylic ester is added per 100 parts by weight of diene rubber. In an addition of below 5 parts by weight, it is impossible to keep the temperature of the rubber composition below a predetermined level. In an addition of above 40 parts by weight, the viscosity of the rubber composition undesirably lowers, which consequently making it impossible to obtain the necessary temperature rise of the rubber composition. In the event that the necessary temperature rise cannot be obtained because of the low viscosity, the temperature rise necessary for vulcanization may be obtained by increasing the set operation temperature of the injection cylinder, or increasing the rotational speed of the screw in the injection cylinder. However, such operation manners are not proper for the following reason. If the set operation temperature of the injection cylinder or the rotational speed of the screw is increased, there is the likelihood that the rubber composition moving in the injection reaches a vulcanization temperature to cause scorching. Also, forcible injection of the rubber composition having a low fluidity to a mold is liable to cause anisotropy in the vulcanized product due to residual internal stress, and consequently deteriorate the physical properties of the vulcanized product.

The ratio of the total content of α, β-unsaturated carboxylic acid and its metal salt (i.e., acid+metal salt thereof) to the content of α, β-unsaturated carboxylic ester, that is, [(acid+metal salt thereof)/ester], ranges from 1.0 to 12, preferably from 1.5 to 8. In a content ratio of below 1.0, the content of α, β-unsaturated carboxylic ester. is so greater as to cause the problems that the effect of lowering the viscosity of the rubber composition is not expected, and the vulcanization is excessively accelerated to bring about premature vulcanization. If the set operation temperature of the injection cylinder or the mold is further lowered to avoid premature vulcanization, the vulcanization time increases and thus fails to raise the productivity. On the other hand, in a content ratio of above 12, the content of the α, β-unsaturated carboxylic alkylester is so smaller as to lessen the effect of lowering the viscosity of the rubber composition, and increase the likelihood of heat generation due to internal friction and scorching.

In the inventive rubber composition, it may be possible to add a filler in addition to the above-mentioned necessary components, i.e., diene rubber, crosslinking agent, unsaturated carboxylic acid and/or metal salt thereof, and unsaturated carboxylic ester. In the case of producing a golf ball from the inventive rubber composition, it may be possible to add filler such as zinc oxide, barium sulfate and calcium carbonate; high specific gravity metal powder such as tungsten powder and molybdenum powder; antioxidant; peptizer; and other additives which are usually used in production of golf balls or golf ball cores. If adding antioxidant, it may be preferable to add 0.2 to 0.5 part by weight of antioxidant per 100 parts by weight of diene rubber.

In the inventive rubber composition, furthermore, it may be preferable not to add plasticizer. This is because of the fact that: the addition of α, β-unsaturated carboxylic ester lowers the viscosity of a rubber composition to the same extent as addition of plasticizer such as phthalate or adipate; and if plasticizer is added, blooming is liable to occur, consequently deteriorating the strength and rigidity of a joining part in contact with the vulcanized product, e.g., a cover of a golf ball.

Figure 1B:
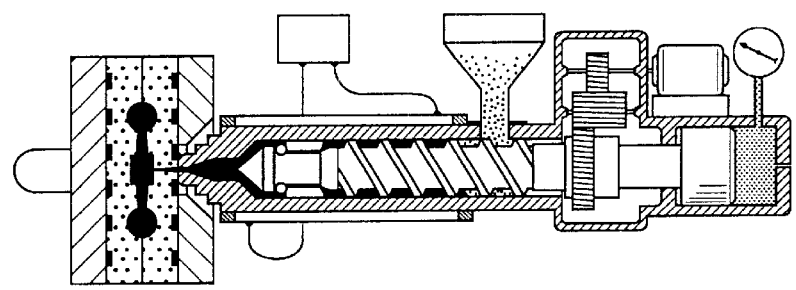
Figure 1C:
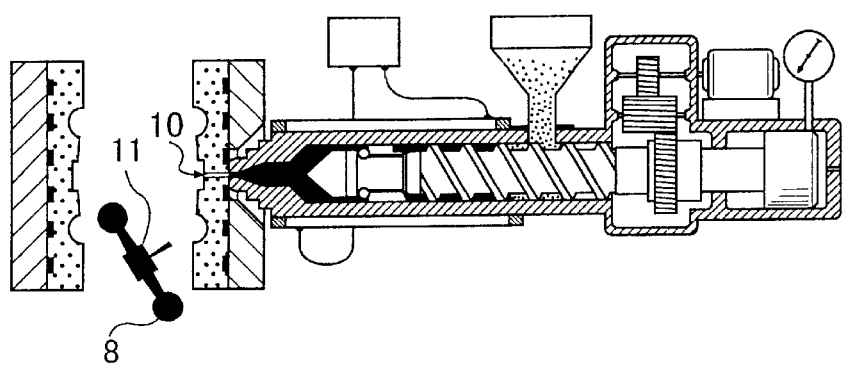

Referring now to FIGS. 1A to 1C, an injection molding method of the above-mentioned inventive rubber composition will be described.

As shown FIG. 1A, the rubber composition is placed into a hopper 1, and then plasticized and moved into a cavity 5 of a mold 4 by rotation of a screw 3 driven by a drive motor 2. Immediately after the screw 3 is shifted to a most forward end position and the cavity 5 is filled with the plasticized rubber composition as shown in FIG. 1B, vulcanization is started. After the vulcanization is completed, as shown in FIG. 1C, the screw 3 is shifted to the initial position and the mold 4 is opened to take out a vulcanized product 8.

To ensure smooth injection of the rubber composition and stable vulcanization, it is preferable to preheat a cylinder 6 for accommodating the rubber composition by a heater 7. The preheating temperature (i.e., the set temperature) of the cylinder 6 is in close connection with the viscosity and occurrence of burning or scorching of the rubber composition. If the preheating temperature is excessively high, the rubber composition is liable to burn due to heat generated by internal friction of the rubber composition at the time of injection. If the preheating temperature is undesirably low, the fluidity of the rubber composition lowers and internal stress remains even after being charged in the cavity 5, consequently causing anisotropy in a vulcanized product. For these reasons, the preheating temperature is preferable to set from 50° C. to 130° C., more preferably 70° C. to 110° C.

The mold 4 is preferable to set at a temperature to complete the vulcanization, specifically 140° C. to 210° C., more preferably 160° C. to 200° C. In the injection molding, when entering the mold 4, the rubber composition has a temperature near the set temperature of the mold 4 because of passing through the preheated cylinder 6 and heat caused by internal friction. Accordingly, the rubber composition can be expected to be completely vulcanized in 1.5 to 8 minutes after being charged in the cavity 5. Conversely, if the rubber composition charged in the cavity 5 is not raised to the temperature near the vulcanization temperature, the vulcanization time increases and the productivity thus lowers. On the other hand, if the rubber composition charged in the cavity 5 has a temperature exceeding the vulcanization temperature, the rubber composition is likely to have been subjected to scorching in the injection cylinder 6 and have some deteriorations, consequently making vulcanized products having reduced resilience and durability.

The injection speed is preferably from about 5 to 90 cc/sec. In an injection speed of below 5 cc/sec., the rubber composition cannot reach the necessary temperature due to insufficient internal heat generation, and a longer vulcanization time is required, thus resulting in a lower productivity. On the other hand, if the injection speed is above 90 cc/sec., the internal heat generation excessively increases, leading to a tendency of scorching.

The area of a gate 10 of the mold 4 is preferably from 0.4 $mm^2$ to 20 $mm^2$, more preferably 0.5 $mm^2$ to 12.6 $mm^2$. If the area of the gate 10 is excessively small, the rubber composition is likely to generate undesirable heat when passing the gate 10, resulting in vulcanization before the rubber composition is completely charged in the cavity 5. In other words, such excessive heat generation in the gate 10 makes the charging incomplete, and the performance characteristic of the vulcanized product consequently lowers. Even if no excessive heat generation occurs when passing the gate 10, internal stress remains in the rubber composition, resulting in anisotropy in the vulcanized product and a reduced performance characteristic. On the other hand, if the gate 10 is so large as to cause no internal heat generation, the vulcanization time increases, consequently reducing the productivity.

It should be noted that the above-mentioned gate area means a total area of gates formed in an inflow wall of the mold 4, specifically, an area of a single gate in the case of formed with the single opening only, or a total of respective areas of a plurality of gates in the case of formed with the plurality of openings. A connection part 11 (i.e., runner part) of the vulcanized product 8 is a waste portion. Accordingly, it may be preferable to form a smaller number of gates, most preferably, a single gate.

As described above, the rubber composition is heated to the temperature near the vulcanization temperature without causing scorching and rubber deterioration during the time when being moved in the injection cylinder 6 from the hopper 1 to the cavity 5 of the mold 4. Accordingly, the vulcanization time can be made to be considerably shorter than the press vulcanization molding. In the case of production of a golf ball, it can be expected to vulcanize and mold the rubber composition in the short time of 1.5 to 8 minutes. In this way, comparing to the press vulcanization molding, the injection vulcanization molding can remarkably increase the productivity and reduce variations in vulcanized products. In addition, a vulcanized product made of the invention rubber composition has no likelihood that oil or plasticizer oozes or blooms on the surface of the vulcanized product. Accordingly, it can be seen that a golf ball made of the inventive rubber composition eliminates the likelihood that the cover is deteriorated by oozed oil or plasticizer, and its performances (e.g., flying distance and shot feeling) lower.

Figure 2A:
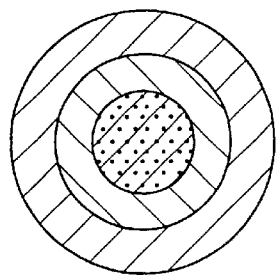
FIGS. 2A to 4 are cross sectional views showing a construction of multi-piece golf balls embodying the invention.
Figure 2B:
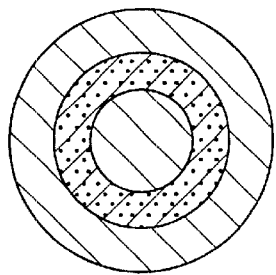
Figure 2C:
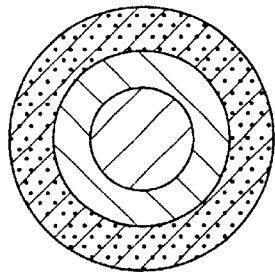
Figure 3A:
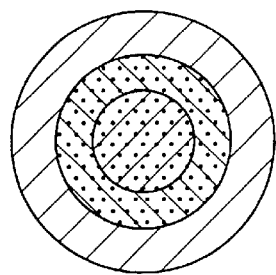
Figure 3B:
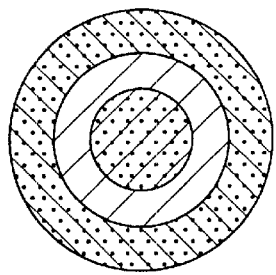
Figure 3C:
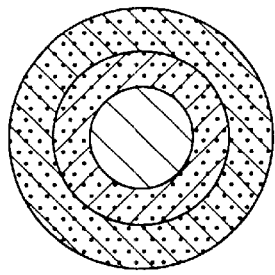
Figure 4:
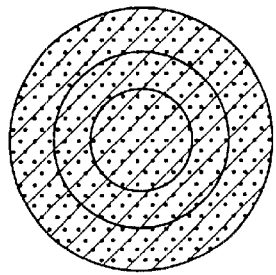

A golf ball according to the invention comprises at least one part made of the inventive rubber composition: specifically, an one-piece golf ball whose main body is made of the inventive rubber composition; a two-piece golf ball whose core is made of the inventive rubber composition; and a multi-piece golf ball whose core is comprised of a plurality of layers, at least one of the plurality of layers being made of the inventive rubber composition. In the multi-piece golf ball, two or more of the plurality of layers may be made of rubber compositions which are different in the proportion of components constituting the inventive rubber composition. In a three-piece golf ball, for example, there may be the following variations shown in FIGS. 2A to 4. In FIGS. 2A to 4, a hatched and dotted portion represents a layer made of an inventive rubber composition. FIGS. 2A to 2C show three-piece golf balls having only one layer made of the inventive rubber composition. FIGS. 3A to 3C show three-piece golf balls having two layers made of different inventive rubber compositions. FIG. 4 shows a three-piece golf ball having all the three layers made of different inventive rubber compositions.

EXAMPLES

Measurement and Evaluation (1) Occurrence of Scorching

It was checked whether scorching has occurred in the injection molding. It was checked whether scorching has occurred by visually observing the appearance of produced golf balls.

(2) Carry

A flying distance (yard) of produced golf balls was measured by shooting them with a golf club W#1 (head speed: 45 m/sec.) mounted on a swing robot manufactured by True Temper Co., Ltd.

(3) Shot Feeling

Ten professional golfers shot produced golf balls to evaluate the receiving impact, contact time on club face, etc. According to the number of golfers saying "good", each golf ball was evaluated. A golf ball which won eight or more golfers was evaluated to be "good"; a golf ball which won four to seven golfers was evaluated to be "ordinary"; and a golf ball which won not more than three golfers was evaluated to be "no good". In Table 2, "good" is represented by the mark "○", "ordinary" by "Δ", and "no good" by "X".

(4) Resistance to Migration

After one month from production of balls, each ball was disassembled, and the weight of the core was measured to find a change from the initial weight (g). A reduction in the core weight (i.e., a negative change) showed migration of plasticizer.

(5) Minimum Vulcanization Time

The term "optimum vulcanization time" means a minimum time during which vulcanization is completed without causing scorching during injection, in other words, a minimum time during which vulcanization reaches the center of the core. A rubber composition was charged or filled into the mold at a cylinder preheating temperature of 95° C., a mold temperature of 180° C., an injection speed of 42 cc/sec, and vulcanizing the charged rubber composition for 2 minutes, 3 minutes, 4 minutes, 5 minutes, or 6 minutes, and checking whether vulcanization reached the core center. The shortest time among these times that allowed vulcanization to reach the core center was determined to be the optimum vulcanization time.

Determination as to whether the core center was vulcanized was made by cutting the molded ball into two parts and visually observing the section. An incomplete vulcanization is recognizable because a visible boundary can be observed between a complete vulcanization part and incomplete vulcanization part.

Production of Golf Balls

There were prepared rubber compositions which respectively had the component proportions shown in Table 1. These rubber compositions were vulcanized and molded into golf ball cores (for golf ball Nos. 1 to 17) having a diameter of 38.4 mm under conditions of a preheating temperature of 95° C., an injection speed of 42 cc/sec., a mold temperature of 180° C., and minimum vulcanization times shown in Table 2. The temperature of each golf ball core immediately after molded was measured by opening the mold immediately after molded, and making a thermometer contact with the core.

TABLE 1

| Components | Proportion (parts by weight) |
| --- | --- |
| Diene Rubber (BR01) | 100 |
| Zinc white | 15 |
| Dicumyl Peroxide | 1 |
| Metal salt of α, β-unsaturated carboxylic acid | Changed from 0 to 50 |
| Carboxylic ester | Changed from 0 to 25 |

In Table 1, specifically, a high cis-polybutadiene having a 97 percent cis-1,4 bond, available from JSR Co., Ltd, was used as the diene rubber. Zinc acrylate and magnesium methacrylate were used as the metal salt of α, β-unsaturated carboxylic acid. Trimethylol propane methacrylate and dioctyl phthalate were used as the carboxylic ester. The trimethylol propane methacrylate corresponds to α, β-unsaturated carboxylic ester that is the essential component of the inventive rubber composition. The dioctyl phthalate served as plasticizer. The trimethylol propane methacrylate was available from Sanshin Kagaku Kogyo Co., Ltd as "Sunester TMP" (product name). The proportion of zinc acrylate and magnesium methacrylate, which are the metal salt of α, β-unsaturated carboxylic acid, and the proportion of trimethylol propane methacrylate and dioctyl phthalate, which are carboxylic ester, are shown in Table 2. The gate area of the used injection mold is also given in Table 2.

Next, a material for golf ball was prepared by mixing 50 parts by weight of "Himilan 1605" (sodium ion neutralized ethylene-methacrylic acid copolymer, available from Mitsui DuPont Polychemical Co., Ltd.), 50 parts by weight of "Himilan 1706" (zinc ion neutralized ethylene-methacrylic acid copolymer, available from Mitsui DuPont Polychemical Co., Ltd.), and 2 parts by weight of titanium oxide with a biaxial kneading type extruder. The cover material was formed into pellets. The used extruder has a screw whose diameter is 45 mm, and whose length (L) and diameter (D) ratio is 36. The screw was rotated at 250 rpm. The mixture was heated to 200° C. at a die of the extruder.

The above-mentioned golf ball cores were formed with a cover layer using the above-mentioned cover material. The formation of the cover layer was performed by injection. The cover layer had a thickness of 2.3 mm. Finally, golf ball Nos. 1 to 17 were produced by carrying out usual golf ball production steps, such as burr removal, pretreatment for painting, and painting.

The flying distance, shot feeling and resistance to migration of each golf ball were evaluated in accordance with the above-mentioned evaluation method. The results are given in Table 2.

TABLE 2

| Ball No. | | | 1 | 2 | 3 | 4 | 5 | 6 | 7 | 8 | 9 | 10 | 11 | 12 |
| --- | --- | --- | --- | --- | --- | --- | --- | --- | --- | --- | --- | --- | --- | --- |
| Metal salt of carboxylic acid (A part) | Zinc acrylate | | 25 | 25 | 25 | 25 | 25 | — | 10 | 15 | 40 | 50 | 25 | 25 |
| | Magnesium methacrylate | | — | — | — | — | — | 25 | — | — | — | — | — | — |
| Carboxylic ester (B part) | Trimethylol methacrylate | | 25 | 17 | 10 | 5 | 1 | 10 | 5 | 6 | 15 | 30 | — | 10 |
| | Dioctyl phthalate | | — | — | — | — | — | — | — | — | — | — | 10 | — |
| Ratio (A/B) | | | 1.0 | 1.5 | 2.5 | 5.0 | 25.0 | 2.5 | 2.0 | 2.5 | 2.7 | 1.6 | 2.5 | 2.5 |
| Gate area (mm²) | | | 3.1 | 3.1 | 3.1 | 3.1 | 3.1 | 3.1 | 3.1 | 3.1 | 3.1 | 3.1 | 3.1 | 0.3 |
| Minimum vulcanization time (min) | | | 6 | 3 | 2 | 2 | — | 2 | 3 | 3 | 3 | 2 | 2 | 2 |
| Evaluation | Scorching | | NO | NO | NO | NO | ※1 | NO | NO | NO | NO | NO | NO | ※2 |
| | Shot feeling | | ○ | ○ | ○ | ○ | — | ○ | ○ | ○ | Δ | X | ○ | ○ |
| | Carry (yard) | | 230 | 232 | 231 | 230 | — | 228 | 222 | 226 | 231 | 232 | 229 | 230 |
| | Resistance to migration | | 0 | 0 | 0 | 0 | — | 0 | 0 | 0 | 0 | 0 | −0.2 | 0 |
| Ball No. | | | | | | | | | | 13 | 14 | 15 | 16 | 17 |
| Metal salt of carboxylic acid (A part) | Zinc acrylate | | | | | | | | | 25 | 25 | 25 | 40 | 45 |
| | Magnesium methacrylate | | | | | | | | | — | — | — | — | — |
| Carboxylic ester (B part) | Trimethylol methacrylate | | | | | | | | | 10 | 10 | 10 | 5.0 | 18 |
| | Dioctyl phthalate | | | | | | | | | — | — | — | — | — |
| Ratio (A/B) | | | | | | | | | | 2.5 | 2.5 | 2.5 | 8.0 | 2.5 |
| Gate area (mm²) | | | | | | | | | | 0.5 | 12.6 | 15.0 | 3.1 | 3.1 |
| Minimum vulcanization time (min) | | | | | | | | | | 2 | 3 | 4 | 2 | 2 |
| Evaluation | Scorching | | | | | | | | | NO | NO | NO | NO | NO |
| | Shot feeling | | | | | | | | | ○ | ○ | ○ | Δ | ○ |
| | Carry (yard) | | | | | | | | | 232 | 230 | 229 | 231 | 230 |
| | Resistance to migration | | | | | | | | | 0 | 0 | 0 | 0 | 0 |

※1 Schorching occurred during injection molding, failing to mold a core.
※2 Due to schorching, the resulting core surface had wrinkles.

It can be seen from Nos. 1 to 5 that under the same injection molding conditions, the minimum vulcanization time became shorter as the content of trimethylol methacrylate decreased, but scorching occurred and the core molding was impossible when the ratio (A/B) of metal salt of carboxylic acid to ester reached 25.0 (see No. 5). Accordingly, it can be seen to be possible to produce a golf ball having an excellent shot feeling, a large carry and free from blooming in a vulcanization molding time as short as 2 to 5 minutes by adjusting the content of carboxylic ester so that the A/B ratio is in a range from 1.0 to 12. This is the same for the case of using zinc acrylate as the metal salt of α, β-unsaturated carboxylic acid and for the case of using magnesiummethacrylate (see No. 6). In the aspect of carry, the golf ball of No. 3 containing zinc acrylate is slightly superior than the golf ball of No. 6 containing magnesium methacrylate because zinc acrylate provides better resilience.

The golf ball of No. 11 containing dioctyl phthalate, which serves as plasticizer, was produced in the short vulcanization time of 2 min. without scorching. However, migration of plasticizer occurred.

A comparison of Nos. 2, 3 and 7 to 10 shows that even in the case of the ratio A/B ratio ranging from 1.5 to 3.0, when the respective contents of the metal salt of carboxylic acid and the carboxylic ester were smaller, the carry decreased because of insufficient resilience (Nos. 7 and 8), and when their respective contents were greater, the shot feeling decreased because of excessive hardness.

A comparison of No. 4 and No. 16 shows that even in the case of the same content of carboxylic ester, when the A/B ratio increased, the shot feeing decreased because the relative content of the metal salt of carboxylic acid increased and the hardness consequently increased.

On the other hand, it can be seen from a comparison of No. 16 and No. 17 that even when the content of the metal salt of carboxylic acid was greater, the good shot feeling could be obtained because the content of the carboxylic ester was so greater that the A/B ratio was in the ranges from 1.0 to 12 (see No. 17). This can be inferred to be owing to the fact that the carboxylic ester crosslinked with the rubber together with the metal salt of carboxylic acid, thereby keeping the hardness of the core from rising without lowering the resilience and flying distance of the golf ball. Accordingly, the content ratio or A/B ratio of the metal salt of carboxylic acid to the carboxylic ester is important as well as the content of each of them.

A comparison of Nos. 3 and 12 to 15 shows that even in the case of using the rubber composition having the proper A/B ratio of the metal salt of carboxylic acid to the carboxylic ester, when the gate area of the used mold was excessively small, scorching occurred at the gate, which consequently deteriorated the product quality because of the poor appearance although maintaining the necessary performance characteristic (No. 12). This comparison shows, on the other hand, that the internal heat generation decreased at the gate of the used mold as the gate area increased, which consequently made the minimum vulcanization time longer. In view of productivity, thus, it may be preferable to set the gate area in the range from 0.4 mm$^2$ to 20 mm$^2$.

As described above, the inventive rubber composition is useable as a rubber composition for injection molding because the heat generation due to internal friction can be suppressed. The injection molding makes it possible to form vulcanized products having less rubber deterioration and internal stress. Accordingly, the inventive rubber composition can be used as material for golf ball which is required to ensure good shot feeling and long flying distance. Also, the inventive rubber composition can assure a reduced vulcanization molding time. Further, the inventive rubber composition which includes no plasticizer can eliminate the likelihood of blooming, thereby keeping the performance characteristics and appearance of the golf ball from deteriorating for a prolonged time.

The inventive golf ball production method uses the novel rubber composition which is suitable for injection molding. Accordingly, golf balls having excellent performance characteristics can be produced at a higher efficiency. Also, the inventive production method, which adopts the injection molding, can remarkably reduce variations in the weight of vulcanized products comparing to the press molding.

While the present invention has been shown and described in detail, the foregoing description is in all aspects illustrative and not restrictive. It is therefore understood that numerous modifications and variations can be devised without departing from the scope of the present invention.

What is claimed is:

1. A method of producing a two-piece golf ball comprising a cover and a core or a one piece golf ball, wherein the core or a main body of the one piece golf ball is composed of a vulcanized rubber composition, comprising the steps of:
    injecting the rubber composition into a mold having a single gate; and
    vulcanizing the rubber composition in the mold to form the core of the golf ball, said rubber composition comprising:
        a diene rubber;
        a crosslinking agent;
        an α, β-unsaturated. carboxylic alkylester; and
        wherein the ratio of the total content of the α, β-unsaturated carboxylic acid and the metal salt to the content of the alkylester, namely, (carboxylic acid+metal salt thereof)/ester ranges from 1.0 to 12.

2. The method according to claim 1, wherein the content of the metal salt of α, β-unsaturated carboxylic acid is 15 to 45 parts by weight per 100 parts by weight of the diene rubber.

3. The method according to claim 1, wherein the α, β-unsaturated carboxylic alkylester is an ester formed from acrylic acid or methacrylic acid and any one of monohydric to trihydric aliphatic alcohols.

4. The method according to claim 1, which excludes plasticizer.

5. The method according to claim 1, wherein the crosslinking agent includes an organic peroxide.

6. The method according to claim 1, wherein the mold has a gate part :area of 0.4 mm$^2$ to 20 mm$^2$.

7. The method according to claim 1, wherein the rubber composition is injected at a speed of 5 to 90 cc/sec.

8. A method of producing a golf ball according to claim 1, comprising the steps of:
    injecting the rubber composition into the mold having a single gate with a gate part area of 0.4 mm$^2$ to 20 mm$^2$; and
    vulcanizing the rubber composition in the mold to form the golf ball.

9. The method according to claim 8, wherein the rubber composition is injected at a speed of 5 to 90 cc/sec.

* * * * *